E. A. SCHREIBER.
TANK CAR HEATING APPARATUS.
APPLICATION FILED APR. 30, 1917.

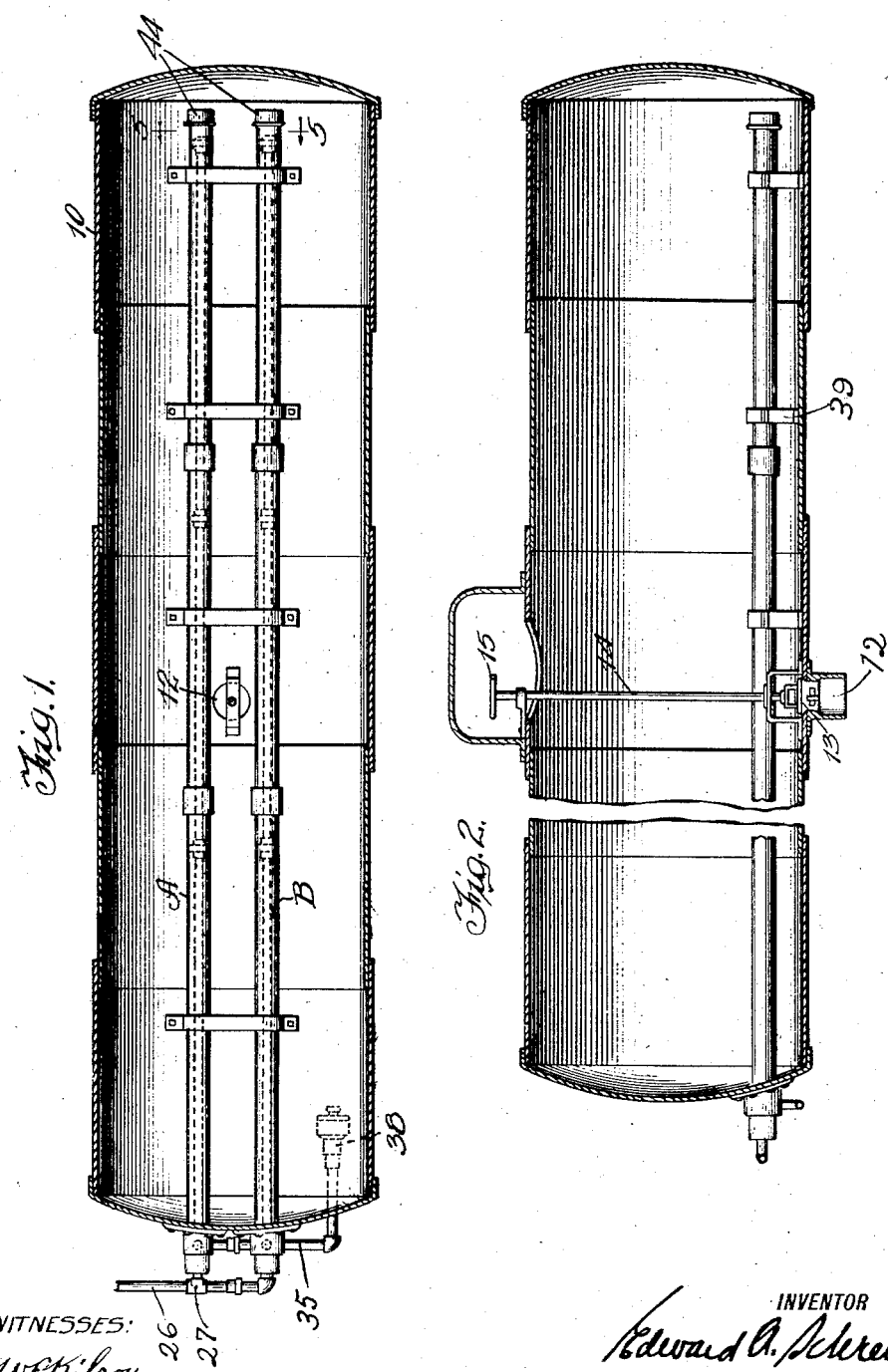

1,381,669.

Patented June 14, 1921.

WITNESSES:
W. F. Kilroy
Harry R. L. White.

INVENTOR
Edward A. Schreiber
BY
Barnett & Truman
ATTORNEYS

E. A. SCHREIBER.
TANK CAR HEATING APPARATUS.
APPLICATION FILED APR. 30, 1917.

1,381,669.

Patented June 14, 1921.
3 SHEETS—SHEET 3.

WITNESSES:
W. T. Kilroy
Harry R. L. White

INVENTOR
Edward A. Schreiber
BY
Barnett & Tieman
ATTORNEYS.

UNITED STATES PATENT OFFICE.

EDWARD A. SCHREIBER, OF CHICAGO, ILLINOIS, ASSIGNOR TO EGBERT H. GOLD, OF CHICAGO, ILLINOIS.

TANK-CAR-HEATING APPARATUS.

1,381,669.            Specification of Letters Patent.      Patented June 14, 1921.

Application filed April 30, 1917. Serial No. 165,530.

*To all whom it may concern:*

Be it known that I, EDWARD A. SCHREIBER, a citizen of the United States, residing at Chicago, in the county of Cook and State of Illinois, have invented certain new and useful Improvements in Tank-Car-Heating Apparatus, of which the following is a specification.

My invention relates to apparatus for applying heat to the contents of a tank car, when the car is used, for example, for the transportation of oil or the like, for the purpose of facilitating the discharge of the cargo from the tank; and a primary object of the invention is to provide a tank car heating apparatus of this type which will be simple and inexpensive in its construction and of which the parts will be capable of self adjustment to compensate for expansion and contraction when the heating medium is turned on or shut off.

A further object of the invention is to provide a construction in which, so far as possible, the apparatus is located outside of the car making it more accessible, in installation and repair, and minimizing the space which the apparatus occupies within the tank and the extent to which it obstructs the outflow of the oil when it is discharged. A further object is to so arrange the apparatus that it will present the least possible obstruction to the discharge of the cargo. A further object is to provide a heating apparatus for a tank car so constructed and arranged as to minimize the danger of injury to the apparatus due to variations in configuration of the tank which may result either from weather changes or the loading or unloading of the tank.

The invention consists in the constructions and arrangements to be hereinafter described and claimed for carrying out the above stated objects and such other incidental objects as will appear from the following description.

The invention is illustrated in the accompanying drawings, in certain preferred embodiments.

Figure 1 is a sectional plan of a tank car fitted with a heating apparatus constructed in accordance with the invention.

Fig. 2 is a vertical sectional view of the car.

Like characters of reference designate like parts in the several figures of the drawings.

Figure 3:
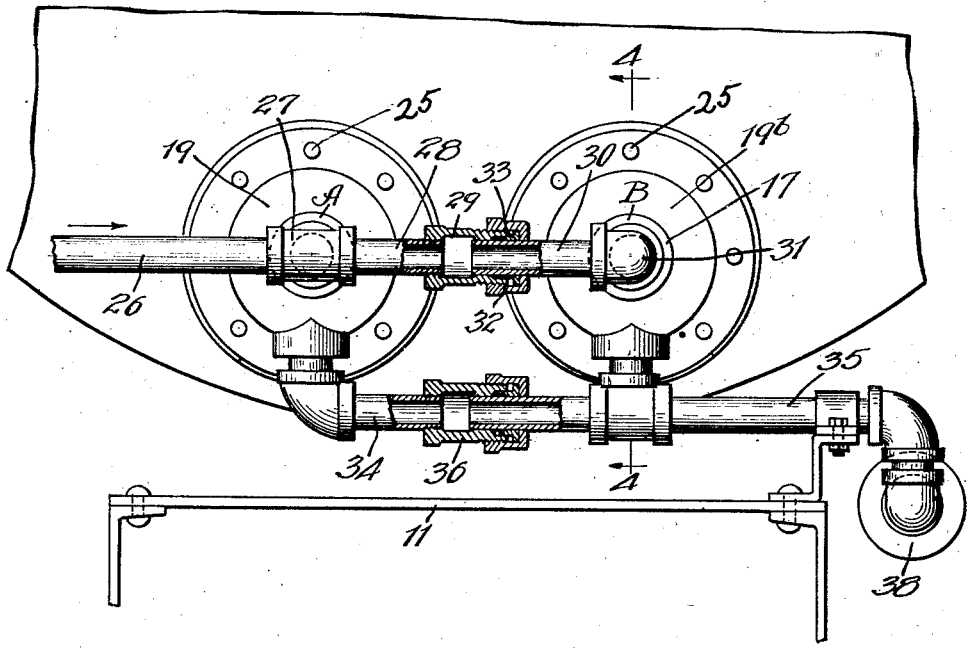
Fig. 3 is a fragmentary end elevation thereof.
Figure 4:
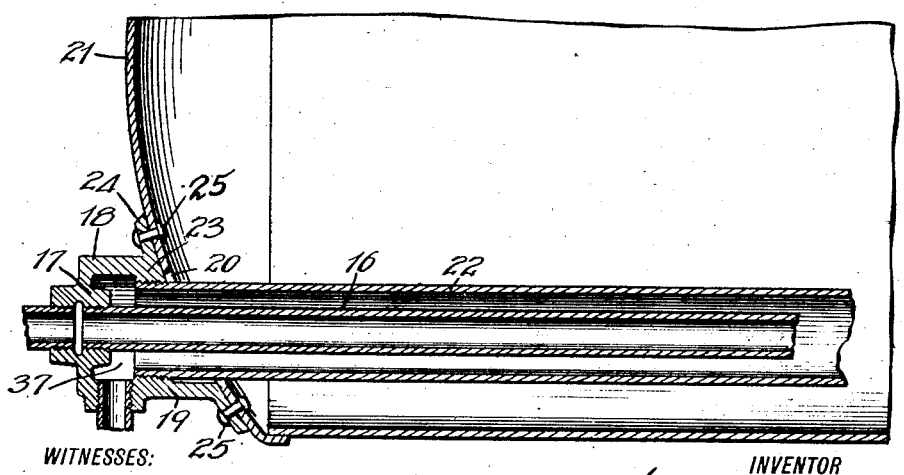
Fig. 4 is a sectional view on line 4—4 of Fig. 3.

Referring first to Figs. 1 to 5 inclusive, 10 indicates the tank and 11 the portion of the under frame of the car on which the tank is supported in any suitable manner. 12 is the opening through which the oil is discharged and 13 the valve for closing this opening which is manipulated by rod 14 having a hand wheel 15.

The heating apparatus consists, in the embodiment shown, of two heating units A and B. A single unit might be employed or the number multiplied without departure from my invention. These heating units extend lengthwise through the tank preferably on opposite sides of the discharge opening 12 and somewhat above the bottom of the tank in which said opening is located. The heating units are rigidly connected to the tank structure at one end. The opposite ends are unattached and the support of the units at intermediate points is such as to permit free expansion and contraction due to temperature changes.

Each unit comprises preferably an inflow pipe 16, the outer end of which is threaded into a boss 17 formed on the outer wall 18 of a header 19 or 19$^b$, as the case may be, which is arranged over an aperture 20 in the end wall 21 of tank 10. The unit comprises, further, a return pipe 22 which surrounds the inflow pipe 16 and is threaded into the inner wall 23 of the header. The header is preferably arranged on the outside of the end wall of the tank being formed with a flange 24 which is secured to the tank by a circle of rivets 25.

26 is a steam supply pipe leading to a T 27 connected with a boss 17 of header 19. The corresponding boss of header 19$^b$ is connected with the T 27 by a telescopic union preferably constructed as follows (Fig. 3): 28 is a pipe section threaded into the T 27 at one end and into a sleeve 29 at the other end. 30 is a pipe section connected by elbow 31 with the boss 17 of header 19^b, the other end of which extends into sleeve 29 so as to have a sliding engagement therewith. 32 is a cap which screws onto sleeve 29 and holds in place a packing 32. A discharge pipe 34, 35 provided with a telescopic union 36 similar to the union above described, and similarly placed, conducts the water of condensation from the spaces 37 within the headers to the steam trap 38.

Figure 5:
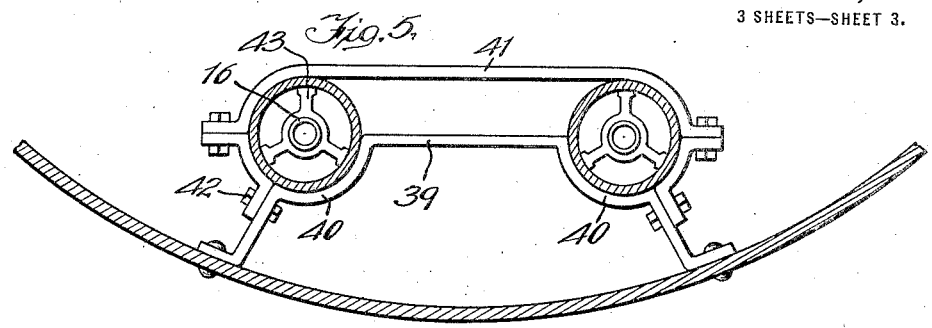
Fig. 5 is a sectional view on line 5—5 of Fig. 1.

The return pipes 22 are supported at suitable intervals by brackets 39 fastened to the bottom of the tank, the brackets being curved at 40 to receive the pipes which are held in place by straps 41 secured to the brackets by bolts 42. The inner or in-flow pipes 16 are held in place by spacers 43 (Fig. 5). The ends of the return pipes remote from the headers are closed by caps 44 while the corresponding ends of the in-flow pipes are open.

Operation: When the car reaches its destination the steam is introduced into the heating units through supply pipe 26. The medium flows through pipes 16 and back through pipes 22. Water of condensation is discharged through steam trap 38. The pipes 16 and 22 have a rigid attachment only at one end. The pipe 16 is free to move with respect to pipe 22 which incloses it. The pipe 22 may expand and contract freely as its support on the tank is a sliding one. The outside pipe 22, before the steam is turned on, may be held fast in the congealed oil, asphaltum, or the like. When the steam comes into contact with it it will expand quite rapidly, but no injury results as the pipe will become freed from the cargo at the place where expansion begins and as this end of the pipe is not attached rigidly to the car there is nothing to check its free expansion. By providing the supply and discharge pipe connections between the headers with telescopic unions the expansion and contraction of these pipe sections or of the headers themselves, does not tend to distort the riveted connection between the headers and the end sheet of the tank as might otherwise be the case. This arrangement is advisable also because the tank will change its shape somewhat with variations in temperature and when subjected to and relieved from the weight of the cargo. By cutting the rivets which fasten the headers to the tank the headers and inner pipes may be removed for repair or replacement without the necessity of the workmen entering the tank. This is to be avoided because the tank is likely to have at the bottom poisonous gases. With the headers removed (the outer pipes can be pulled out far enough to detach them from the headers) the gases being heavy will escape so that it will be safe for the workmen to enter the tank to detach the outer pipes from their supports, if this becomes necessary.

Figure 6:
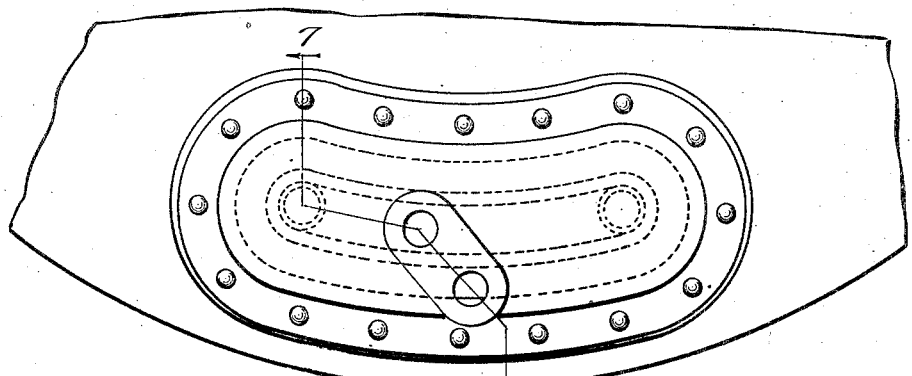
Fig. 6 is a fragmentary end elevation, and Fig. 7 a longitudinal sectional view illustrating a modified construction, the sectional view of Fig. 7 being taken on line 7—7 of Fig. 6.
Figure 7:
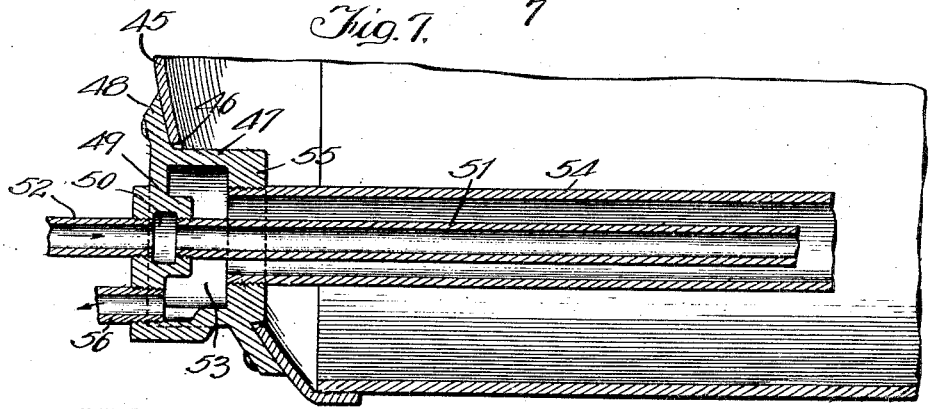

In the modified construction shown in Figs. 6 and 7, the end sheet 45 of the tank is provided with a single aperture 46 in which is located a header 47 having a flange 48 riveted to the outside of the end sheet. This header is formed with an elongated boss 49 in which is formed a recess 50. The in-flow pipes 51 are threaded into opposite ends of the boss 49. Supply pipe 52 is threaded into the outer wall of the header at the middle of recess 50. The header is also formed with a recess chamber 53 and the return pipes 54 are screwed into the inner wall 55 of the header so as to communicate with the recess 53. 56 is the discharge pipe for draining water of condensation from recess 53.

I claim:

1. In a tank car, the combination with a tank, of a heating apparatus comprising a radiating unit positioned in the tank lengthwise thereof, a header secured to the end wall of the tank to which one end of said radiating unit is rigidly attached, the other end of the same being free from attachment to the tank, means associated with the header for introducing heating medium into and discharging the same from the radiating unit and means for slidably supporting said radiating unit at points intermediate its ends.

2. In a tank car, the combination with a tank the end wall of which is formed with an aperture, of a heating apparatus comprising a radiating unit positioned in the tank lengthwise thereof, a header secured to the end wall of the tank over said aperture to which one end of said radiating unit is rigidly attached, the other end of the same being free from attachment to the tank, means associated with the header for introducing heating medium into and discharging the same from the radiating unit and means for slidably supporting said radiating unit at points intermediate its ends.

3. In a tank car, the combination with a tank, of a heating apparatus comprising a radiating unit positioned in the tank lengthwise thereof composed of an inflow pipe, a return pipe and a header secured to the end wall of the tank to which said inflow and return pipes are rigidly connected at one end, the other ends of said pipes being free from attachment; means for slidably supporting said radiating unit intermediate its ends and supply and discharge pipes on the outside of the tank connected with said header so as to communicate with said inflow and return pipes, respectively.

4. In a tank car, the combination with a tank, the end wall of which is formed with an aperture, of a hollow header secured to the outside of the end wall so as to cover said aperture, an inflow pipe secured to the outer wall of said header, a return pipe secured to the inner wall thereof and surrounding and substantially concentric with said inflow pipe, means for supporting said pipes intermediate their ends which permit their expansion and contraction and supply and discharge pipes on the outside of the tank connected with said header so as to communicate with said inflow and return pipes, respectively.

5. In a tank car, the combination with a tank, of a heating apparatus comprising a radiating unit positioned in the tank lengthwise thereof composed of an inflow pipe, a return pipe and a header secured to the outside of the end wall of the tank to which said inflow and return pipes are rigidly connected at one end, the other ends of said pipes being free from attachment, supply and discharge pipes on the outside of the tank connected with said header so as to communicate with said inflow and return pipes, respectively, and means within the tank providing a sliding support for said radiating unit.

6. In a tank car, the combination with a tank, the end wall of which is formed with an aperture, of a hollow header secured to the outside of the end wall so as to cover said aperture, an inflow pipe secured to the outer wall of said header, a return pipe secured to the inner wall thereof and surrounding said inflow pipe, supply and discharge pipes on the outside of the tank connected with said header so as to communicate with said inflow and return pipes, respectively, means within the tank providing a sliding support for the return pipe, and spacing devices between said pipes.

7. In a tank car, the combination with a tank, the end wall of which is formed with two apertures, hollow headers riveted to said end wall so as to cover said apertures, pipes located within said tank and connected with said headers for the circulation of medium from each header back to the same, a supply pipe on the outside of the car rigidly connected with one of said headers and having a telescopic connection with the other header, and a discharge pipe on the outside of the car having a rigid connection with one of said headers, and a telescopic connection with the other header.

8. In a tank car, the combination with a tank having an outlet opening in the bottom and an aperture at one end thereof, of a header secured to the outside of said tank over said aperture and formed with inlet and discharge passages, an inflow pipe secured at one end to said header and communicating with the inlet passage thereof, a return pipe surrounding the inflow pipe with which the latter communicates, said return pipe being attached at one end to said header in communication with the discharge passage thereof, the other end being closed, means associated with said header for supplying a heating medium to and discharging said medium from said header through its inlet and discharge ports, respectively, and means for supporting said pipes so that they may freely expand and contract.

9. In a tank car, the combination with a tank having an outlet opening in the bottom and an aperture at one end thereof, of a header secured to the outside of said tank over said aperture and formed with inlet and discharge passages, an inflow pipe secured at one end to said header and communicating with the inlet passage thereof, a return pipe surrounding the inflow pipe with which the latter communicates, said return pipe being attached at one end to said header in communication with the discharge passage thereof, the other end being closed, means associated with said header for supplying a heating medium to and discharging said medium from said header through its inlet and discharge ports, respectively, and supports for the outer pipe which are attached to the tank walls at points out of line with said outlet opening whereby the cargo may flow unobstructedly along the bottom of the tank to said outlet opening.

10. In a tank car, the combination with a tank having an aperture in the wall thereof, of a header secured to the outside of the tank over said aperture and formed with inlet and discharge passages, an inflow pipe secured at one end to said header and communicating with the inlet passage thereof, a return pipe surrounding said inflow pipe with which the latter communicates, said return pipe being attached at one end to said header in communication with the discharge passage thereof, the other end being closed, means associated with said header for supplying a heating medium to and discharging said medium from said header through its inlet and discharge ports, respectively, and means for supporting said pipes so that they may freely expand and contract.

11. In a tank car, the combination with a tank, of a radiating unit supported slidably within the tank comprising an inflow pipe and a return pipe surrounding the inflow pipe with which the latter communicates, and means outside the tank for rigidly connecting said pipes at one end of the unit to said tank which provides passages to and from said pipes for the introduction thereinto and the discharge therefrom of a heating meduim.

12. In a tank car, the combination with a tank, of a radiating unit supported slidably within the tank comprising an inflow pipe and a return pipe surrounding the inflow pipe with which the latter communicates, and means outside the tank for rigidly connecting said pipes at one end of the unit to said tank which provides passages to and from said pipes for the introduction thereinto and the discharge therefrom of a heating medium, said means comprising supply and discharge pipes outside of the car provided with telescopic expansion joints.

13. In a tank car, the combination with a tank, of a pair of radiating units supported slidably within the tank, each comprising an inflow pipe and a return pipe surrounding the inflow pipe with which the latter communicates, supply and discharge pipes for introducing heating medium into and discharging the same from said units, said supply and discharge pipes being provided with telescopic expansion joints between their connections with said units, and means outside of the tank for rigidly connecting the inflow pipes and return pipes of the units at one end thereof, in each case, to said tank and for providing passages between the inflow and return pipes and said supply and discharge pipes, respectively.

14. In a tank car, the combination with a tank, of a pair of heating units arranged within the tank with their extremities projecting through one end of the same, each unit comprising an inflow pipe and a return pipe surrounding the inflow pipe with which the latter communicates, means for rigidly connecting said pipes at one end to the tank, means for supporting the pipes within the tanks so that they are free to expand and contract, a supply pipe connected with the inflow pipes of both units, and a discharge pipe connected with the return pipes of both units, said supply and discharge pipes being provided with telescopic joints between their points of connection with said units.

15. In a tank car, the combination with a tank having an aperture in the end wall thereof, of a header secured to the outside of the tank over said aperture and formed with inlet and discharge passages, a heating element extending lengthwise through the car attached to said header and having inflow and return ducts communicating with said inlet and discharge passages, respectively, of the header, means for supplying a heating medium to and discharging the same from the header through said inlet and discharge passages, respectively, and means for supporting the heating element so that it may freely expand and contract.

EDWARD A. SCHREIBER.